United States Patent Office 2,982,780
Patented May 2, 1961

2,982,780

PROCESS FOR THE PRODUCTION OF BENZO-NITRILE AND PHTHALONITRILES

William L. Fierce, Crystal Lake, and Walter J. Sandner, Carpentersville, Ill., assignors to The Pure Oil Company, Chicago, Ill., a corporation of Ohio No Drawing. Filed Oct. 20, 1958, Ser. No. 768,072

13 Claims. (Cl. 260—465)

This invention relates to new and useful improvements in processes for preparation of aromatic nitriles, particularly, benzonitrile and the phthalonitriles, by reaction of benzene with cyanogen at elevated temperatures in the presence of a catalyst.

Benzonitrile is a well-known organic chemical which is useful as an intermediate in the preparation of a variety of organic compounds. The phthalonitriles are also well known organic compounds which are useful intermediates in the preparation of polyester resins. Merz and Weith reported in Ber., 10, 753 (1877) that cyanogen and benzene react when passed through a hot tube (glowing faintly red) to form benzonitrile and terephthalonitrile in very small amounts, as well as small amounts of biphenyl. G. J. Janz, in J. Am. Chem. Soc., 74, 4529 (1952), reported work on the reaction of cyanogen with benzene in the gas phase, at atmospheric pressure and temperatures above 500° C. In Janz' work no catalysts were used. At 500° C., using an equimolar ratio of the reactants, Janz produced only traces of benzonitrile. At 650° C., the yields were still quite small. At 745° C. and 2-3 seconds contact time, using a twofold excess of cyanogen in the feed, the yield of benzonitrile was as high as 42%, calculated on the benzene conversion per pass. Some (1–5%) phthalonitriles were also obtained in the reaction product. Janz investigated the use of silica chips, pumice chips, and cobalt oxide on alumina, as possible catalysts, all of which were stated to be ineffective. Janz also states that if benzene is used in excess, biphenyl is also formed.

It is one object of this invention to provide a new and improved process for the preparation of benzonitrile and phthalonitriles by high-temperature reaction of benzene with cyanogen in the presence of a catalyst.

A feature of this invention is the provision of a process in which benzene is reacted with cyanogen in the presence of a catalyst consisting of refractory support having deposited thereon a small amount of a group VIII noble metal.

Other objects and features of this invention will become apparent from time to time throughout the specification and claims as hereinafter related.

This invention is based upon our discovery that benzonitrile and phthalonitriles are produced in good yields by reaction of benzene with cyanogen at temperatures in the range from about 475° to 1000° C. in contact with a catalyst consisting of a refractory support having deposited thereon a small amount of a group VIII noble metal. The support used is preferably a high-surface-area, refractory oxide, such as activated alumina or a silica-alumina cracking catalyst, although low-surface-area supports can be used. Within this range of temperature, cyanogen reacts with benzene to produce a mixture of benzonitrile and phthalonitriles, with hydrogen cyanide as by-product, in much greater yields than are obtained in the absence of a catalyst.

This reaction proceeds well at atmospheric pressure, although it may be carried out at either subatmospheric or superatmospheric pressures. At superatmospheric pressures, the reaction becomes slightly more selective for the formation of phthalonitriles. In carrying out this reaction, the preferred mol ratio of reactants is in the range from 0.1 to 10 mols of cyanogen per mol of benzene. Higher proportions of cyanogen tend to increase the yield of phthalonitriles, while higher proportions of benzene tend to produce biphenyl as a reaction by-product. The reaction gases may be passed through the reaction zone at a gaseous hourly space velocity of approximately 50 to 2000, with a space velocity of 150 to 500 being preferred. In this process, the term "space velocity" refers to the ratio of the volume of the reactant gases at standard temperature and pressure charged per hour to the volume of the reaction space.

In carrying out this process, the benzene and cyanogen may be premixed and preheated, or may be separately charged to the reaction zone which is maintained at the desired reaction temperature. Any type of reaction zone which is resistant to attack by the reactants or reaction products may be used. Quartz, high-silica glass, stainless steel, or other refractory and corrosion-resistant materials may be used. The reaction zone may be heated by any suitable means, such as combustion gases applied externally to the reactor, or may be heated by external or internal electric means, including resistance heaters and induction heaters, or by heating tubes extending through the reactor. Another method of heating which has been developed in recent years and which is particularly useful in the process is the use of hot, refractory pebbles which are intermittently heated to the desired reaction temperature. When hot refractory pebbles are used in this process, they may also be used as the means of support for the catalyst.

The product gases from the reaction zone consist of a mixture of benzonitrile, phthalonitriles, including isophthalonitrile and terephthalonitrile, unreacted cyanogen and benzene, and by-product hydrogen cyanide and biphenyl. These reaction gases are withdrawn from the reaction zone and cooled to a temperature sufficiently low to condense the product nitriles. The product which is condensed from the reaction gases will ordinarily have to be fractionated to obtain pure benzonitrile or phthalonitriles. The unreacted benzene and/or cyanogen may be recycled to the reaction zone together with by-product biphenyl, and additional quantities of benzene and cyanogen so as to convert them into further quantities of benzonitrile and the phthalonitriles.

The following non-limiting examples are illustrative of the scope of this invention:

*Example I*

A gaseous mixture of helium and cyanogen was bubbled through benzene held at a temperature of about 70° C. by a water bath. The gas mixture was then passed through a vertically-mounted, electrically-heated reactor tube of Vycor high-silica glass heated to the desired reaction temperature. Samples of the charge and product gases from each run were taken and analyzed by the mass spectrometer. Liquid products obtained were analyzed by infrared spectroscopy. In one run, using a cyanogen/benzene mol ratio of 0.90, a reaction zone temperature of 553° C., and a gaseous hourly space velocity of charge gases of 232, for a period of 0.66 hour, there was no conversion of cyanogen, no conversion of benzene, and no aromatic nitriles were formed. In a second run using this apparatus, at a cyanogen/benzene mol ratio 0.952, a reaction zone temperature of 663° C., and gaseous hourly space velocity of 237, there was a 17.6% conversion of cyanogen, a 2.2% yield of benzonitrile (based on cyanogen charged), and no yield of phthalonitriles.

*Example II*

In another series of experiments using the apparatus of Example I, the reaction tube was filled with a catalyst consisting of 0.5% w. rhodium on alumina pellets. Cyanogen, benzene, and helium diluent were charged, as in Example I, to the reactor tube at a cyanogen/benzene mol ratio of 0.775. The reactor tube was maintained at 495° C. and the reactants were passed therethrough at a gaseous hourly space velocity of 433. In this run, there was a 33.3% w. conversion of cyanogen and a yield of 0.83% w. of benzonitrile was obtained. No phthalonitriles were obtained in this run.

In a second run using the same apparatus and catalyst, cyanogen and benzene in a mol ratio of 0.667 were charged to the reactor tube at a gaseous hourly space velocity of 424. The reaction zone was maintained at a temperature of 652° C. Under these conditions, there was an 84.5% w. conversion of cyanogen and a 72.5% w. conversion of benzene. Benzonitrile was obtained in a yield per pass of 27.0% w., while terephthalonitrile was obtained in a yield of 2.2% w. per pass.

In a third run using the same apparatus and catalyst, cyanogen and benzene were fed to the reactor in a cyanogen/benzene mol ratio of 6.37, and a gaseous hourly space velocity of charge gases of 438. The reactor tube was maintained at a temperature of 504° C. Under these reaction conditions, there was a 12.7% w. conversion of cyanogen and a 31.0% w. conversion of benzene, with no aromatic nitrile being produced. Using this ratio of reactants, a temperature of about 600° C. is required to produce a small yield of benzonitrile. At a temperature of about 700° C., a yield of about 4% of a mixture of the phthalonitriles is obtained.

In still another run, cyanogen and benzene were fed to the reactor, using the same catalyst, at a cyanogen/benzene mol ratio of 2.66 at a gaseous hourly space velocity of charge gases of 483. The reactor was maintained at a temperature of 656° C. Under these reaction conditions, there was a 27.7% w. conversion of cyanogen and a 78.8% w. conversion of benzene. A 9% w. yield of benzonitrile was obtained together with a yield of about 1.5% w. of a mixture of phthalonitriles.

*Example III*

Another run is carried out using the apparatus described in Example II, filled with a catalyst consisting of 0.5% w. rhodium on alumina. In this run, the reaction pressure is increased to about 3 atmospheres (about 50 p.s.i.a.). The reactor tube is maintained at a temperature of about 700° C. The reactants are fed through the reactor tube using a cyanogen/benzene mol ratio of about 4. Under these reaction conditions, there is a cyanogen conversion of about 35% and benzene conversion of about 80%. Benzonitrile is obtained in a yield of about 10% together with a mixture of phthalonitriles in a yield of about 7%.

*Example IV*

In another series of runs using the apparatus of Example II, the effect of different noble metal catalysts is observed. In the first of these runs, the reactor tube is charged with a catalyst consisting of 0.5% w. palladium on alumina. In the second, third, and fourth runs, the catalysts used consist of 0.5% w. platinum on alumina, 0.5% w. iridium on alumina, and 0.5% w. osmium on alumina, respectively. Using a feed consisting of an equimolar mixture of cyanogen and benzene diluted with helium, circulated at atmospheric pressure, a gaseous hourly space velocity of charge gases of about 450, and a reaction temperature of about 650° C., benzonitrile is obtained in each case in yields of 25–35%.

While we have described our invention fully and completely, with special emphasis upon several preferred embodiments, we wish it understood that other reaction conditions may be used within the scope of the appended claims. For example, the catalysts which may be used in this process include high-surface-area, refractory oxides, such as activated alumina, silica-alumina cracking catalysts, silica gel, and other refractory mixed oxide gels, and low-surface-area, refractory oxides, such as alumina, silica, etc., having supported thereon 0.05–2.0% w. (preferably about 0.5% w.) of a Group VIII noble metal.

Catalysts having high-surface-area supports, however, are the most active ones. The reaction between cyanogen and benzene takes place in the range from about 475°–1000° C. using these catalysts. Generally, the preferred temperature range is about 550–700° C., but this may vary, depending upon the particular catalysts used and the ratio of reactants. The benzene and cyanogen react generally under the conditions of this process in almost any mixture provided that the proper catalyst and reaction temperature are selected. Generally, the preferred ratio of reactants used varies from 0.1–5 moles of cyanogen per mol of benzene. When a molar excess of cyanogen is used, a higher temperature is required to effect reaction but a greater proportion of phthalonitriles is obtained. When a very low proportion of cyanogen is used, there is a greater tendency to form substantial quantities of biphenyl as a reaction by-product. The reactants may be fed at a gaseous hourly space velocity ranging from 50 to 2000, although rates of feed outside this range may be used if desired. At very low feed rates, e.g., less than 50, yields are extremely low due to decomposition of benzene and polymerization of cyanogen. At very high space velocities, the reaction rate is extremely low. It is apparent therefore that this reaction is not completely inoperative when the reactants are feed at space velocities outside the range of 50–2000, although that range of space velocity is highly preferred. Because of the very high temperature at which this reaction is carried out, it is preferred that the process be operated at atmospheric or a very slight superatmospheric pressure, e.g., 15–20 p.s.i.a. However, as was pointed out above, there are some advantages to operating the process at superatmospheric pressure in that higher yields of phthalonitriles may be obtained.

What is claimed is:

1. A method of preparing compounds of the group consisting of benzonitrile and the phthalonitriles which comprises reacting benzene with cyanogen at a temperature in the range of about 475°–1000° C. in contact with a catalyst consisting of a small but catalytically effective amount of a group VIII noble metal deposited on a refractory support.

2. A method in accordance with claim 1 in which the catalyst consists of 0.05–2.0% wt. of a group VIII noble metal supported on a high-surface-area, refractory oxide.

3. A method in accordance with claim 2 in which the reaction mixture consists essentially of 0.1–5 mols of cyanogen per mol of benzene.

4. A method in accordance with claim 2 in which the reactants are passed through a heated reaction zone at a gaseous hourly space velocity of 50–2000.

5. A method in accordance with claim 2 in which the reaction pressure is substantially atmospheric pressure.

6. A method in accordance with claim 2 in which the reaction pressure is in excess of about 2 atmospheres and phthalonitriles are recovered from the reaction effluent.

7. A method in accordance with claim 2 in which the catalyst consists of a group VIII noble metal supported on alumina and the major product is benzonitrile.

8. A method in accordance with claim 7 in which the concentration of noble metal on alumina is about 0.05–2.0% w.

9. A method in accordance with claim 8 in which the noble metal is rhodium.

10. A method in accordance with claim 8 in which the noble metal is palladium.

11. A method in accordance with claim 8 in which the noble metal is platinum.

12. A method in accordance with claim 8 in which the noble metal is iridium.

13. A method in accordance with claim 8 in which the noble metal is osmium.

References Cited in the file of this patent

Janz: J. Am. Chem. Soc., 74, pages 4529–4531 (1952).